Patented Oct. 3, 1939

2,174,632

UNITED STATES PATENT OFFICE 2,174,632

COLORING MATTER

Ernest George Hewish, Winnipeg, Manitoba, Canada, assignor of one-half to Carl Buchholz, Churchill, Manitoba, Canada No Drawing. Application July 3, 1937, Serial No. 151,968

3 Claims. (Cl. 134—39)

This invention relates to improvements in coloring matter for application to gravel, shale, asphalt, cement and building products generally.

A further object of my invention is to provide substances of the character herewithin described which are impervious to the elements.

A still further object of the invention is to provide substances of this character which are easy to compound and economical to produce.

With the above more important objects and such other objects as may appear as the specification proceeds, this invention consists in the combination of materials as hereinafter set forth.

This invention consists in providing coloring matter of red, green or other colors, the same being particularly adapted for coloring shale, gravel, asphalt and the like for use upon driveways, walks, tennis courts and plots, and in the formulae herewithin contained, I shall specify the ingredients used when red color is applied, and when green color is applied, both on comminuted material such as gravel, shale and the like and also upon asphalt.

In the formulae given below, toluidine red is used for the color base of the red substance and green oxide of chromium for the green substance. The extender for the red substance is calcium sulphate and for the green substance, lead chromate and calcium sulphate. These extenders, it should be noted, are unaffected by lime or its compounds.

The binder in each case is composed of kettle-boiled linseed oil, resin varnish and pilchard oil, whereas the drier is cobalt drier of 1.6% metal concentration.

The formulae for the two coloring substances as used upon gravel, shale and the like are as follows:

Red coloring substance

| | Per cent |
|---|---|
| Toluidine red | 15.50 |
| Calcium sulphate | 31 |
| Boiled linseed oil | 8.50 |
| Resin varnish | 25.75 |
| Pilchard oil | 17.25 |
| Colbalt drier (1.6% metal concentration) | 2 |
| | 100 |

Green coloring substance

| | Per cent |
|---|---|
| Green oxide of chromium | 9 |
| Lead chromate | 2 |
| Calcium sulphate | 43 |
| Boiled linseed oil | 8 |
| Resin varnish | 22 |
| Pilchard oil | 14 |
| Colbalt drier (1.6% metal concentration) | 2 |
| | 100 |

The formulae for the two coloring substances when used for asphalt are as follows:

Red coloring substance

| | Per cent |
|---|---|
| Iron oxide pure | 24 |
| Silicate of magnesium | 10.90 |
| Kettle boiled linseed oil | 17.20 |
| Alkyd resin | 25.50 |
| Pilchard oil | 16 |
| Mineral spirits and drier | 6.40 |
| | 100 |

Green coloring substance

| | Per cent |
|---|---|
| C. P. chrome green | 15 |
| Silicates of magnesium | 5 |
| Kettle boiled linseed oil | 20 |
| Alkyd resin | 31.90 |
| Pilchard oil | 20 |
| Mineral spirits and drier | 8.10 |
| | 100 |

In the above last two lists of ingredients, the non-volatile portion of the resin shall not be less than 50% and the non-volatile portion shall contain not less than 45% glyceryl phthalate.

I have found that in the manufacture of colored asphalt the above last two lists of ingredients are the more suitable but if desired, these may be used for the shale and gravel as well.

The process of applying my color to gravel, shale and the like simply consists of an admixture of a quantity of the color with the material to be colored, the same being agitated during the process of drying to prevent it from sticking if necessary.

When mixing the color with material to form a hard surface, herein referred to as asphalt, the mass of material is not agitated during the drying process and I have found that by employing the above last two lists of ingredients, the mass when colored and dried coheres with great tenacity to form a very desirable surface.

In this specification, I have referred several times to the coloring of asphalt with my coloring compound but I wish it to be clearly understood that in using this expression, I am not only referring to asphalt proper but to a mass of particles of material which when coated with the compound set forth in the last two lists contained in this specification, will cohere in the manner of asphalt and present the appearance that asphalt would present if colored, in other words, a hard granular mass.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. A composition of matter to be applied to the particles of a granular mass such as gravel, shale, sand and the like consisting of 15.5% of toluidine red, 31% of calcium sulphate, 8.5% of boiled linseed oil, 25.75% of resin varnish, 17.25% of pilchard oil and 2% of cobalt drier of 1.6% metal concentration.

2. A composition of matter to be applied to the particles of a granular mass such as gravel, shale, sand and the like, comprising 8%–20% of a color base, 25%–50% of calcium sulphate, 5%–10% of boiled linseed oil, 15%–30% of resin varnish, 10%–20% of pilchard oil and 1%–4% of cobalt drier.

3. A composition of matter to be applied to the particles of a granular mass such as gravel, shale, sand and the like, comprising 9% of green oxide of chromium, 2% of lead chromate, 43% of calcium sulphate, 8% of boiled linseed oil, 22% of resin varnish, 14% of pilchard oil and 2% of cobalt drier of 1.6% metal concentration.

ERNEST GEORGE HEWISH.